United States Patent
Liao

(10) Patent No.: US 9,920,779 B2
(45) Date of Patent: Mar. 20, 2018

(54) AIRCRAFT HYDRAULIC THERMAL MANAGEMENT SYSTEM

(71) Applicant: The Boeing Company, Chicago, IL (US)

(72) Inventor: Jianmin Liao, Bothell, WA (US)

(73) Assignee: The Boeing Company, Chicago, IL (US)

( * ) Notice: Subject to any disclaimer, the term of this patent is extended or adjusted under 35 U.S.C. 154(b) by 168 days.

(21) Appl. No.: 14/816,818

(22) Filed: Aug. 3, 2015

(65) Prior Publication Data

US 2017/0037883 A1 Feb. 9, 2017

(51) Int. Cl.
*F15B 21/04* (2006.01)
*B64D 37/34* (2006.01)
(Continued)

(52) U.S. Cl.
CPC ............ *F15B 21/042* (2013.01); *B23P 19/04* (2013.01); *B64D 37/34* (2013.01); *F01P 7/00* (2013.01);
(Continued)

(58) Field of Classification Search
CPC .............. F15B 21/042; F15B 2211/611; F15B 2211/62; B64D 37/34
See application file for complete search history.

(56) References Cited

U.S. PATENT DOCUMENTS 2,916,875 A * 12/1959 Morley .................... F02C 7/224
60/39.08
3,080,716 A * 3/1963 Cummings ............... F02C 7/14
123/196 AB
(Continued)

FOREIGN PATENT DOCUMENTS

EP 2843243 A1 3/2015
FR 2862724 A1 5/2005
(Continued)

OTHER PUBLICATIONS

European Search Report Application No. EP 16182229 reported on Dec. 22, 2016.

*Primary Examiner* — Michael Leslie
*Assistant Examiner* — Matthew Wiblin
(74) *Attorney, Agent, or Firm* — Miller, Matthias & Hull LLP

(57) ABSTRACT

An aircraft hydraulic thermal management system utilizes fuel to cool hydraulic fluid by means of a heat exchanger. A hydraulic pump includes a case drain flow of hydraulic fluid at a first temperature to drive a hydraulic motor; the hydraulic motor circulates hydraulic fluid to a reservoir at a second temperature. The heat exchanger is positioned remotely of the fuel tank, and has first and second channels positioned in thermal communication to transfer heat from the hydraulic fluid to the fuel. The hydraulic motor is mechanically coupled to the fuel pump; the hydraulic motor, driven by case drain flow through the first channel, thus operates the fuel pump to move fuel through the second channel. The thermal management system is configured to assure that a) the hydraulic pump circulates hydraulic fluid to the reservoir at the second temperature, and b) the second temperature is always lower than the first temperature.

20 Claims, 3 Drawing Sheets

(51) Int. Cl.
    *F01P 7/00* (2006.01)
    *B23P 19/04* (2006.01)
(52) U.S. Cl.
    CPC ...... *F15B 2211/611* (2013.01); *F15B 2211/62* (2013.01); *F15B 2211/7058* (2013.01)

(56) References Cited

U.S. PATENT DOCUMENTS

| | | | | |
|---|---|---|---|---|
| 4,172,493 | A * | 10/1979 | Jacobs | B60H 1/00014 165/42 |
| 4,705,100 | A * | 11/1987 | Black | F01D 25/18 123/553 |
| 4,899,850 | A * | 2/1990 | Koller | F01D 25/20 184/27.2 |
| 5,100,082 | A | 3/1992 | Archung | |
| 5,355,939 | A * | 10/1994 | Aoki | B60H 1/22 165/119 |
| 5,615,547 | A * | 4/1997 | Beutin | F02C 7/14 60/39.08 |
| 7,287,368 | B2 * | 10/2007 | Tumelty | F01D 25/20 184/6.11 |
| 9,051,056 | B2 * | 6/2015 | Leese | B64D 37/34 |
| 2006/0260323 | A1 | 11/2006 | Moulebhar | |
| 2009/0321062 | A1 * | 12/2009 | Ebigt | B64D 13/06 165/276 |
| 2012/0175080 | A1 | 7/2012 | Muehthaler et al. | |
| 2015/0237799 | A1 * | 8/2015 | Trowbridge | F16H 61/4139 60/490 |

FOREIGN PATENT DOCUMENTS

| | | | | |
|---|---|---|---|---|
| IN | 201300828 | I1 * | 7/2015 | |
| JP | 57157806 | A * | 9/1982 | ............ F15B 21/042 |

\* cited by examiner

AIRCRAFT HYDRAULIC THERMAL MANAGEMENT SYSTEM

FIELD

The present disclosure relates generally to aircraft, and more particularly to a hydraulic thermal management system configured for use on an aircraft.

BACKGROUND

Numerous systems are simultaneously tasked to efficiently and effectively support control of an aircraft during both ground and flight operations. For example, hydraulic systems manage hydraulic fluids configured to move flight controls, along with landing gear, and brakes. Electrical and fuel systems, among others, are designed to work harmoniously with the hydraulic systems to provide for continuous and reliable support of aircraft operations and functions.

In spite of much progress in aircraft systems design, demands to produce greater economies and efficiencies within and among various aircraft systems remain constant. One of such demands relates to the practice of utilizing fuel for reducing thermal loads produced by aircraft hydraulic systems. For example, there is continuing pressure to avoid a common practice of placement of hydraulic heat exchangers inside of aircraft fuel tanks. Thus, for many reasons, e.g. fuel contamination, cost, regulations, and manufacturing issues, it has become desirable that such heat exchangers be mounted away from and/or out of direct fuel tank contact.

Accordingly, a system for cooling aircraft hydraulic fluid that would enable a hydraulic fluid heat exchanger to be positioned outside of an aircraft fuel tank would be considered to be beneficial.

Moreover, if such a system were to offer increased aircraft operational efficiencies along with enhanced functionality, including the avoidance of dependence upon ram air, such an improved system may constitute a significant advance in aircraft systems design.

SUMMARY

In accordance with one aspect of the present disclosure, a hydraulic thermal management system includes a hydraulic motor mechanically coupled to a fuel pump configured to channel fuel through one side of a heat exchanger situated outside of a fuel tank for reducing temperature of a hydraulic fluid channeled through a separate side of the heat exchanger.

In accordance with another aspect of the present disclosure, the hydraulic motor directly drives the fuel pump, which moves the fuel through the one side of the heat exchanger to cool the hydraulic fluid.

In accordance with another aspect of the present disclosure, the hydraulic motor is driven by case drain flow of a hydraulic pump in an aircraft hydraulic system. As such, the case drain flow passes through the other separate side of the heat exchanger.

In accordance with yet another aspect of the present disclosure, the hydraulic system includes a bypass valve to divert hydraulic fluid of the case drain flow to a reservoir or to the heat exchanger, depending on whether cooling is required.

In accordance with a still further aspect of the present disclosure, the bypass valve is temperature controlled for determining whether to channel the hydraulic fluid through the heat exchanger or to the reservoir.

The features, functions, and advantages disclosed herein can be achieved independently in various embodiments or may be combined in yet other embodiments, the details of which may be better appreciated with reference to the following description and drawings.

DETAILED DESCRIPTION

It should be understood that disclosed embodiments are only schematically illustrated and described. It should be further understood that the following detailed description is merely exemplary, and not intended to be limiting. As such, although the present disclosure is, for purposes of explanatory convenience, depicted and described in only the illustrative embodiments presented, the disclosure may be implemented in numerous other embodiments, and within various other systems and/or environments neither shown nor described herein. Finally, any actual scope of the disclosure is as defined by the appended claims.

Figures 1, 1A:
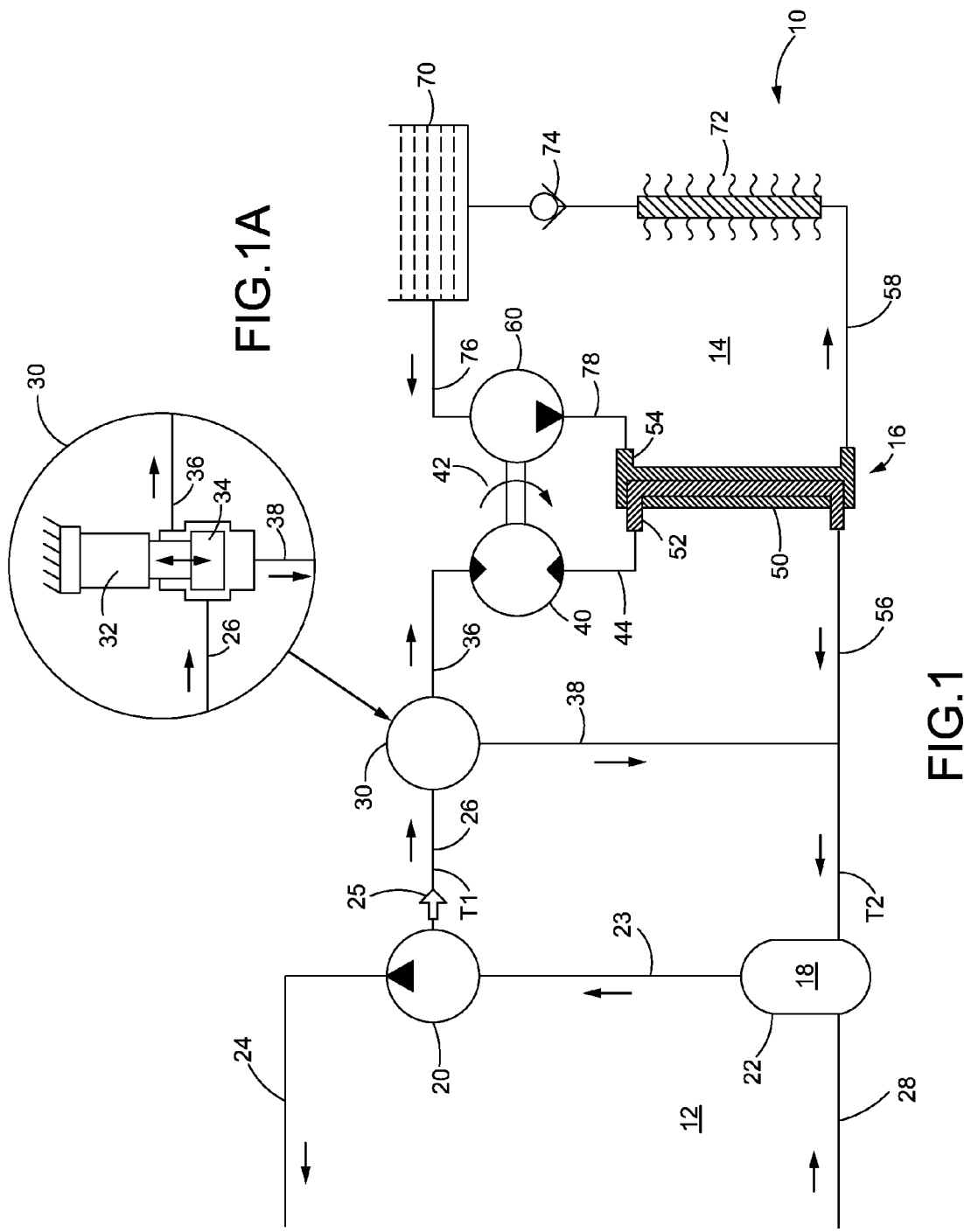
FIG. 1 is a schematic view of one embodiment of an aircraft hydraulic thermal management system configured in accordance with the present disclosure.
FIG. 1A is an enlarged view of a portion of FIG. 1.

FIG. 1 is a schematic view of an aircraft hydraulic thermal management system 10. The thermal management system 10 is based upon an interface between an aircraft hydraulic system 12 and an aircraft fuel system 14, and includes various components of the two respective individual, closed circuit systems 12, 14, as described hereinbelow. As such, the thermal management system 10 provides an integrated and interactive system of components and/or elements of the two otherwise entirely separate systems 12, 14.

A primary interface component between the systems 12, 14 is a heat exchanger 16, through which the heat of hydraulic fluid may be transferred to the fuel for cooling the hydraulic fluid. As those skilled in the art will appreciate, heat and thus operating temperatures may build up in the aircraft hydraulic system 12, as generated by operation of a hydraulic pump 20 and hydraulic user systems (not shown) including aircraft rudder, elevator, ailerons, spoilers, flaps, landing gear, etc. Within the hydraulic system 12, the hydraulic pump 20 draws hydraulic fluid 18 from a hydraulic reservoir 22; the hydraulic pump 20 is connected to the reservoir 22 by a fluid conduit; i.e. pump suction line, 23. The hydraulic fluid 18 then travels from the pump 20 through a main hydraulic conduit, or primary hydraulic supply line, 24 to support the functions of the above-described hydraulic user systems. Upon return from the above-described heat generating components, the hydraulic fluid returns via return line 28 back to the hydraulic reservoir 22, as part of a hydraulic cycle.

In the disclosed configuration of the thermal management system 10, the pump 20 includes a case drain flow 25 (schematically depicted by an open arrow) that represents a portion of hydraulic fluid 18 that exits the pump 20 and travels through a pump case drain line 26 prior to reaching a hydraulic bypass valve 30. The case drain flow 25 provides a first step for control of temperature, and hence the cooling, of the hydraulic fluid. Referring now also to FIG. 1A, the hydraulic bypass valve 30, shown in greater detail, includes a temperature responsive thermal actuator 32 coupled directly to a valve spool 34. The valve spool is configured to move between two linear limits of motion as a function of temperature, for the purpose of throttling fluid through either a bypass valve line 36 and on to a hydraulic motor 40, or through a separate bypass valve return line 38 for direct return of the hydraulic fluid to the reservoir 22, depending on a predetermined desired temperature of the hydraulic fluid.

As earlier noted, the heat exchanger 16 provides an effective heat transfer mechanism between the hydraulic system 12 and the fuel system 14. As noted also, each of the systems 12, 14 is closed, and each is rigorously designed to avoid contamination of one fluid with the other. The typical pressure of the aircraft hydraulic system 12 is approximately 3,000 psi, while the case drain flow 25 from the case drain line 26 is at a 2 to 3 gallons per minute flow rate at 100 to 150 psi pressure. The case drain flow 25 is thus effective to provide power to drive the hydraulic motor 40, which in turn drives a fuel pump 60, as further detailed below.

The body 50 of the heat exchanger 16 includes a first channel 52 to accommodate passage of hydraulic fluid for cooling, and a second channel 54, extending parallel to channel 52, for the conveyance of aviation fuel for commensurately receiving heat from the hydraulic fluid. Upon exiting the first channel 52 of the heat exchanger 16, the hydraulic fluid passes through a conduit 56 for return to the reservoir 22. When the hydraulic system 12 is at steady-state, the hydraulic fluid temperature T1 of the case drain flow 25 may range up to 30° F. higher than the temperature T2 of the hydraulic fluid passing through the conduit 56 upon its return to the reservoir 22. Moreover, the hydraulic fluid temperature T1 may range up to at least 50° F. higher than temperature of fuel within the fuel tank 70.

Fuel circulation within the fuel system 14 is created by the fuel pump 60, although the latter is powered by the hydraulic motor 40 to which the fuel pump 60 is mechanically linked via mechanical coupling 42. In the illustrated embodiment, the fuel pump 60 is directly coupled to the hydraulic motor 40 such that the fuel pump and the hydraulic motor rotate at the same speed. In another embodiment, the system 10 may include a gearbox (not shown) mounted between the fuel pump 60 and the hydraulic motor 40 such that the fuel pump 60 may be operated at a different speed than the hydraulic motor 40. In this case, the gearbox enables the flow of fuel channeled through the heat exchanger 50 to be optimized, and thus optimize the thermal management of the hydraulic fluid, based on the particular aircraft or heat transfer requirements.

It should be noted that the fuel pump 60 is a secondary pump used only for cooling of hydraulic fluid. As such, the fuel pump 60 is not a primary pump of the type used to supply fuel to the prime movers, or the engines, configured to propel the aircraft. For the purpose of cooling the hydraulic fluid, the fuel pump 60 draws a portion of fuel from the fuel tank 70 through a conduit, such as a pump suction line 76. From the pump 60, the fuel travels through conduit 78 to the second channel 54 of the heat exchanger 16, where it receives heat from the hydraulic fluid 18 via the heat exchanger 16. From the heat exchanger 16, the fuel then passes through the exit conduit 58 for return to the fuel tank 70, albeit passing through a heatsink 72 before reaching the fuel tank 70. The heatsink 72 in the described embodiment may be a finned line as shown to facilitate a more rapid heat transfer, or may be an un-finned line of sufficient length to dissipate heat prior to return to the fuel tank 70 through a check valve 74, as shown, to avoid unintended backflow.

Figure 2:
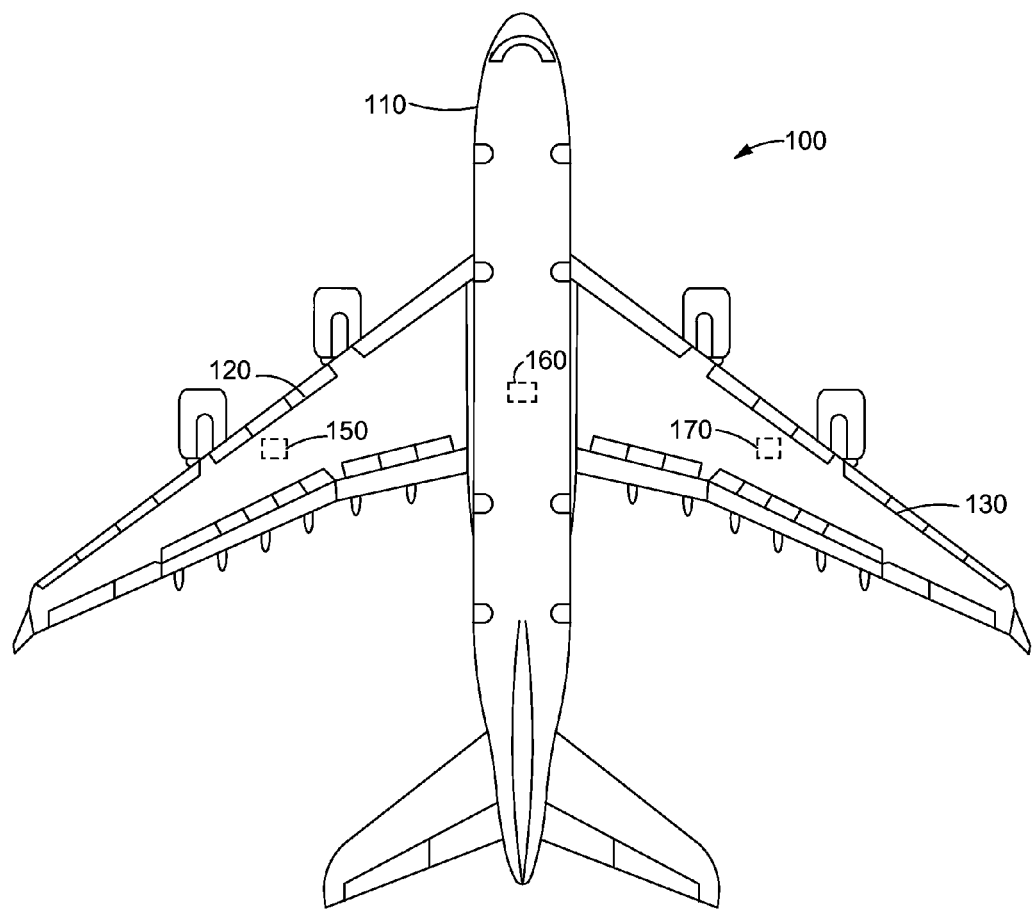
FIG. 2 is a view of an exemplary aircraft, including locations within the aircraft where such an aircraft hydraulic thermal management system may be installed.

Referring now to FIG. 2, an exemplary configuration of an aircraft 100 is depicted. The aircraft 100 includes a fuselage 110 and left and right wings 120 and 130, respectively, as would be typical. Normally, large airplanes have multiple hydraulic systems with hydraulic pumps that may be directly driven by the engine, by bleed air, or powered by electricity, to assure appropriate system redundancy. The thermal management system 10 is located in the vicinity of the case drain flow 25 of the hydraulic pump 20 of each hydraulic system 12 (FIG. 1). As such, locations 150, 160, and 170 respectively reveal potential locations of three such systems 10, 10', and 10" for the three aircraft hydraulic systems 12. Systems 10' and 10" are contemplated as being identical to the hydraulic thermal management system 10, and are thus not separately shown herein.

Figure 3:
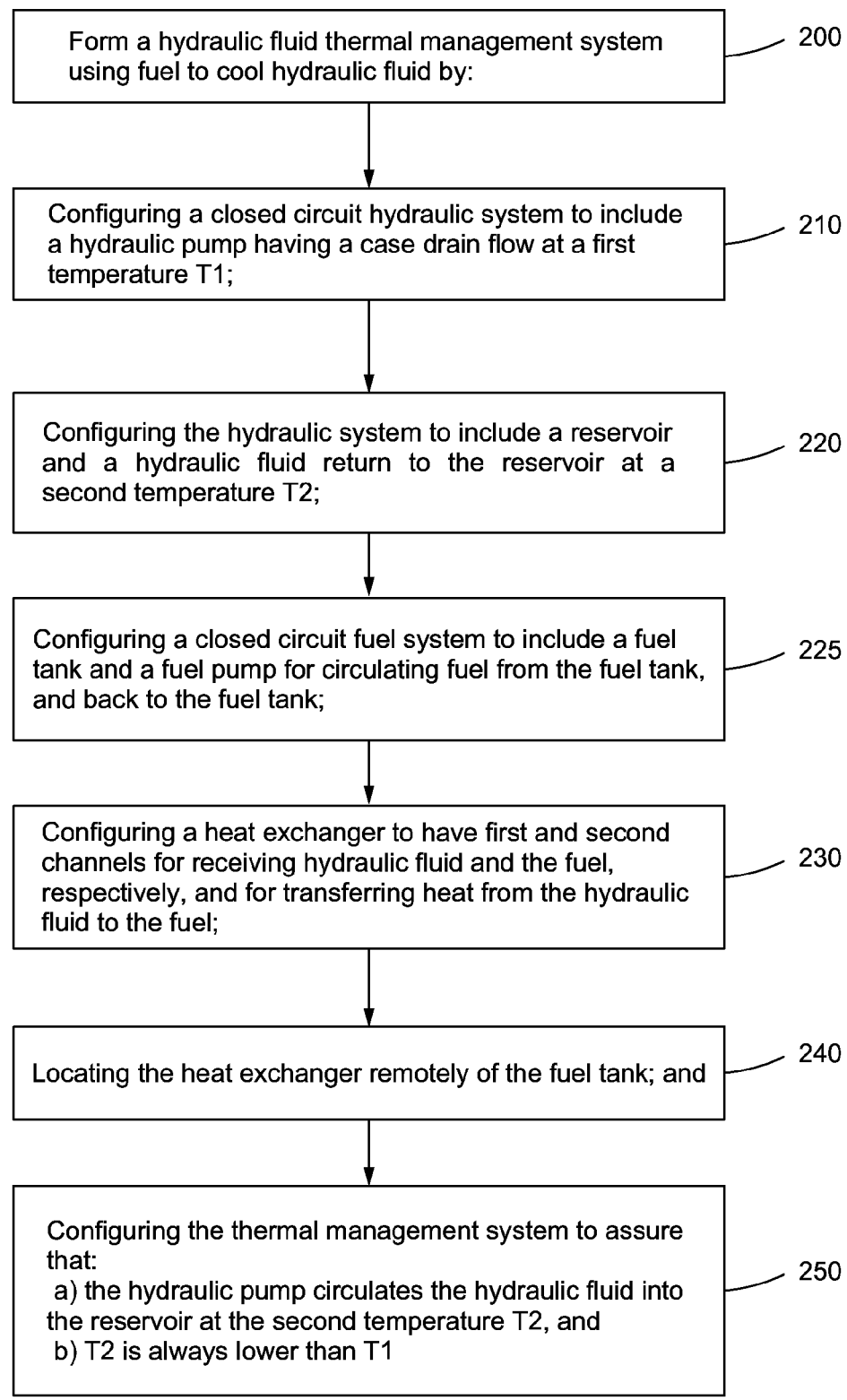
FIG. 3 is a flowchart depicting an exemplary method of making the described embodiment of the aircraft hydraulic thermal management system of the present disclosure.

Referring now to FIG. 3, an exemplary method of making the thermal management system 10 is described in reference to the flowchart depicted. Thus, one exemplary method of forming an aircraft hydraulic thermal management system using fuel to cool hydraulic fluid, in accordance with block 200 of FIG. 3, may include steps of:

configuring a closed circuit hydraulic system to include a hydraulic pump having a case drain flow at a first temperature T1, in accordance with block 210 of FIG. 3;

configuring the hydraulic system to further include a hydraulic fluid reservoir, and a hydraulic fluid return to the reservoir at a second temperature T2, in accordance with block 220 of FIG. 3;

configuring a closed circuit fuel system to include a fuel tank and a fuel pump for circulating fuel from the fuel tank and ultimately back to the fuel tank, in accordance with block 225 of FIG. 3;

configuring a heat exchanger to have first and second channels for receiving the hydraulic fluid and the fuel, respectively, and for transferring heat from the hydraulic fluid to the fuel, in accordance with block 230 of FIG. 3;

locating the heat exchanger remotely of the fuel tank, in accordance with block 240 of FIG. 3; and configuring the thermal management system to assure that a) the hydraulic pump circulates the hydraulic fluid to the reservoir at the second temperature T2, and b) the second temperature T2 is always lower than the first temperature T1, in accordance with block 250 of FIG. 3.

The method may also include steps of:

securing a hydraulic motor and a hydraulic bypass valve to the hydraulic thermal management system, and configuring the case drain flow of the hydraulic pump to drive the hydraulic motor; and placing the bypass valve between the hydraulic pump and the hydraulic motor, and configuring a first operational mode to channel case drain flow from the hydraulic pump directly to the reservoir, and a second operational mode to channel the case drain flow from the hydraulic pump directly to the hydraulic motor.

Finally, this disclosure may cover numerous embodiments and variants neither shown nor described herein. For example, specific dimensions of the heat exchanger 16, the hydraulic motor 40, and the fuel pump 60 can be tailored and/or adjusted to support various aircraft sizes and geometries. As such, and by way of further example, the particular forms and/or shapes of the components can be adjusted to optimize individual system performance characteristics.

What is claimed is:

1. An aircraft hydraulic thermal management system, comprising:

a hydraulic pump including a case drain flow of hydraulic fluid at a first temperature;
a hydraulic motor, a reservoir of hydraulic fluid, and a hydraulic bypass valve, wherein the hydraulic pump draws the hydraulic fluid from the reservoir, and wherein the case drain flow drives the hydraulic motor;
a fuel tank;
a fuel pump configured to circulate fuel from the fuel tank, and then to transfer the fuel back into the fuel tank at a second temperature;
a heat exchanger having first and second channels, the first configured to receive the hydraulic fluid via the hydraulic motor, and the second configured to receive the fuel, the heat exchanger configured to transfer heat from the hydraulic fluid to the fuel, the heat exchanger being positioned remotely of the fuel tank;
wherein the hydraulic motor is positioned upstream of the heat exchanger and downstream of the bypass valve; and
wherein the thermal management system is configured to assure that a) the fuel pump circulates the fuel into the fuel tank at the second temperature, and b) the second temperature is always lower than the first temperature.

2. The aircraft hydraulic thermal management system of claim 1,
wherein the bypass valve is disposed between the hydraulic pump and the hydraulic motor, and is configured to channel the case drain flow into the reservoir in a first operational mode, and to channel the case drain flow to the hydraulic motor in a second operational mode.

3. The aircraft hydraulic thermal management system of claim 2, wherein the fuel pump is disposed between the fuel tank and the heat exchanger, and wherein the fuel pump is driven by the hydraulic motor.

4. The aircraft hydraulic thermal management system of claim 3, wherein the fuel pump is mechanically coupled to hydraulic motor.

5. The aircraft hydraulic thermal management system of claim 1, wherein the hydraulic bypass valve comprises a thermal actuator and a valve spool, and wherein the thermal actuator is coupled to the valve spool, and wherein the valve spool is configured to shift the hydraulic bypass valve from a first position corresponding to the first operational mode to a second position corresponding to the second operational mode, as a function of temperature of the hydraulic fluid.

6. The aircraft hydraulic thermal management system of claim 5, wherein the hydraulic motor is interposed between the hydraulic bypass valve and the first channel of the heat exchanger.

7. The aircraft hydraulic thermal management system of claim 1, wherein the fuel pump is a secondary fuel pump dedicated to circulation of fuel through the second channel of the heat exchanger.

8. The aircraft hydraulic thermal management system of claim 2, wherein the first operational mode comprises direct movement of the case drain flow from the hydraulic pump to the reservoir.

9. The aircraft hydraulic thermal management system of claim 2, wherein the second operational mode comprises movement of the case drain flow through the hydraulic motor and into the first channel of the heat exchanger before return of the hydraulic fluid to the reservoir.

10. An aircraft, comprising:
a hydraulic thermal management system including a hydraulic pump having a case drain flow, a hydraulic motor driven by the case drain flow from the hydraulic pump, and a reservoir of hydraulic fluid, the hydraulic pump drawing hydraulic fluid from the reservoir; the thermal management system having the case drain flow of hydraulic fluid at a first temperature; a fuel tank; a fuel pump configured to circulate fuel from the fuel pump at a second temperature and then to transfer the fuel into the fuel tank; a heat exchanger having first and second channels configured to receive the hydraulic fluid and the fuel, respectively, and to transfer heat from the hydraulic fluid to the fuel, the heat exchanger being positioned remotely of the fuel tank; wherein the hydraulic motor is positioned upstream of the heat exchanger; and wherein the thermal management system is configured to assure that a) the fuel pump circulates the fuel from the fuel pump at the second temperature, and b) the second temperature is always lower than the first temperature.

11. The aircraft of claim 10, wherein the hydraulic thermal management system further comprises a
bypass valve disposed between the hydraulic pump and the hydraulic motor, and is configured to channel the case drain flow into the reservoir in a first operational mode, and to channel the case drain flow to the hydraulic motor in a second operational mode.

12. The aircraft of claim 11, wherein the fuel pump is disposed between the fuel tank and the heat exchanger, and wherein the fuel pump is driven by the hydraulic motor.

13. The aircraft of claim 12, wherein the fuel pump is mechanically coupled to hydraulic motor.

14. The aircraft of claim 10, wherein the hydraulic bypass valve comprises a thermal actuator and a valve spool, and wherein the thermal actuator is coupled to the valve spool, and wherein the valve spool is configured to shift the hydraulic bypass valve from a first position corresponding to the first operational mode to a second position corresponding to the second operational mode, as a function of temperature of the hydraulic fluid.

15. The aircraft of claim 14, wherein the hydraulic motor is interposed between the hydraulic bypass valve and the first channel of the heat exchanger.

16. The aircraft of claim 10, wherein the fuel pump is a secondary fuel pump dedicated to circulation of fuel through the second channel of the heat exchanger.

17. The aircraft of claim 11, wherein the first operational mode comprises direct movement of the case drain flow to the reservoir.

18. The aircraft of claim 11, wherein the second operational mode comprises movement of the case drain flow through the hydraulic motor and into the first channel of the heat exchanger before return of the case drain flow to the reservoir.

19. A method of making an aircraft hydraulic thermal management system, comprising the steps of:
configuring a hydraulic pump and a hydraulic motor to have a case drain flow of hydraulic fluid at a first temperature;
securing a fuel tank and a fuel pump to the hydraulic thermal management system;
configuring the fuel pump to circulate fuel from the fuel tank, and then to transfer the fuel back into the fuel tank at a second temperature;
securing a heat exchanger to the hydraulic thermal management system, and configuring first and second channels in the heat exchanger to receive the hydraulic fluid and the fuel, respectively, and to transfer heat from the hydraulic fluid to the fuel;
locating the heat exchanger remotely of the fuel tank;

locating the hydraulic motor upstream of the heat exchanger; and configuring the thermal management system to assure that a) the fuel pump circulates the fuel into the fuel tank at the second temperature, and b) the second temperature is always lower than the first temperature.

20. The method of claim 19, further comprising the steps of:

securing a hydraulic reservoir, the hydraulic motor, and a hydraulic bypass valve to the hydraulic thermal management system, and configuring the hydraulic pump to include a case drain flow to drive the hydraulic motor;

configuring the fuel pump to be driven by the hydraulic motor; and placing the bypass valve between the hydraulic pump and the hydraulic motor, and configuring a first operational mode to channel the case drain flow directly into the reservoir, and a second operational mode to channel the case drain flow directly to the hydraulic motor.

\* \* \* \* \*